Figure 1:
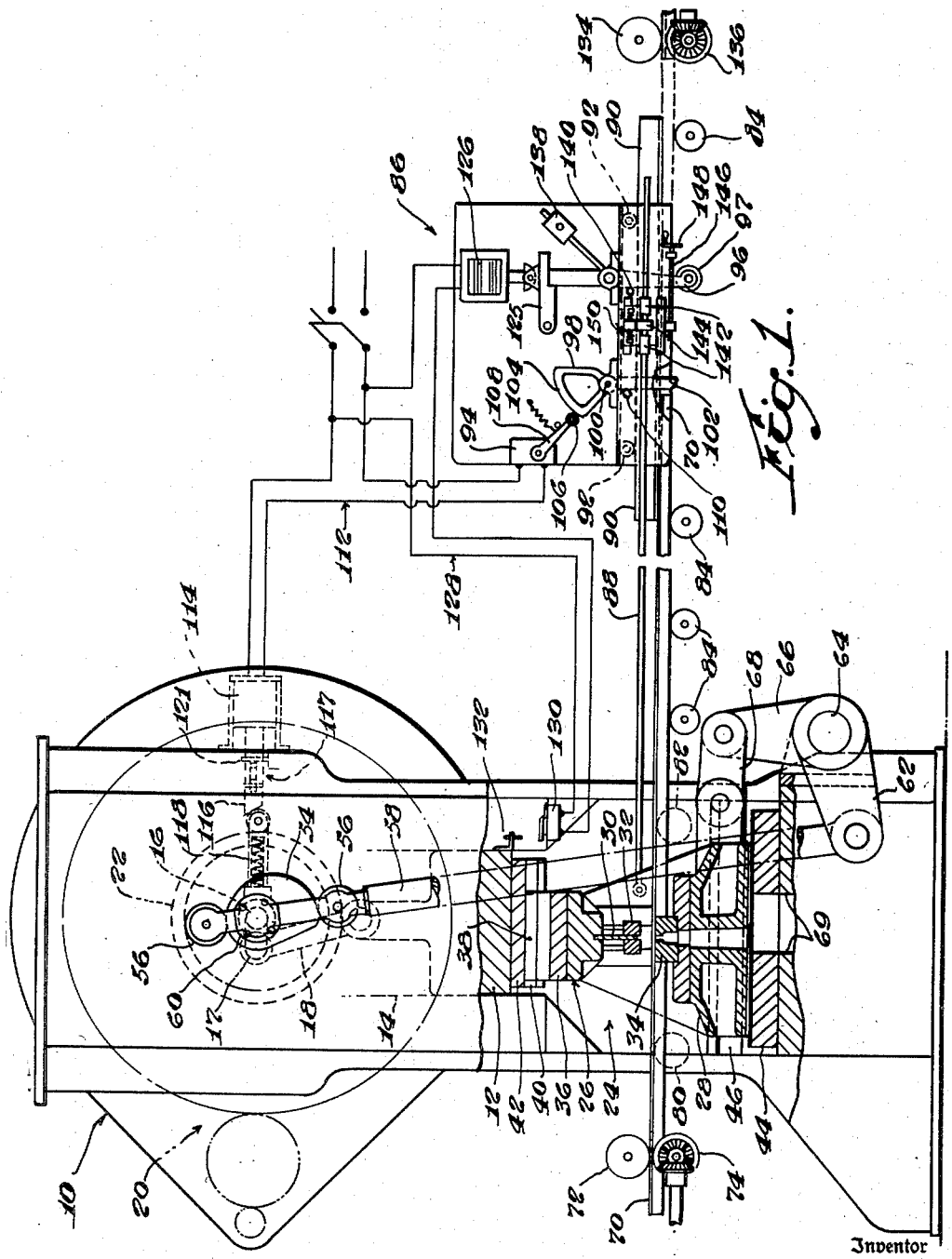

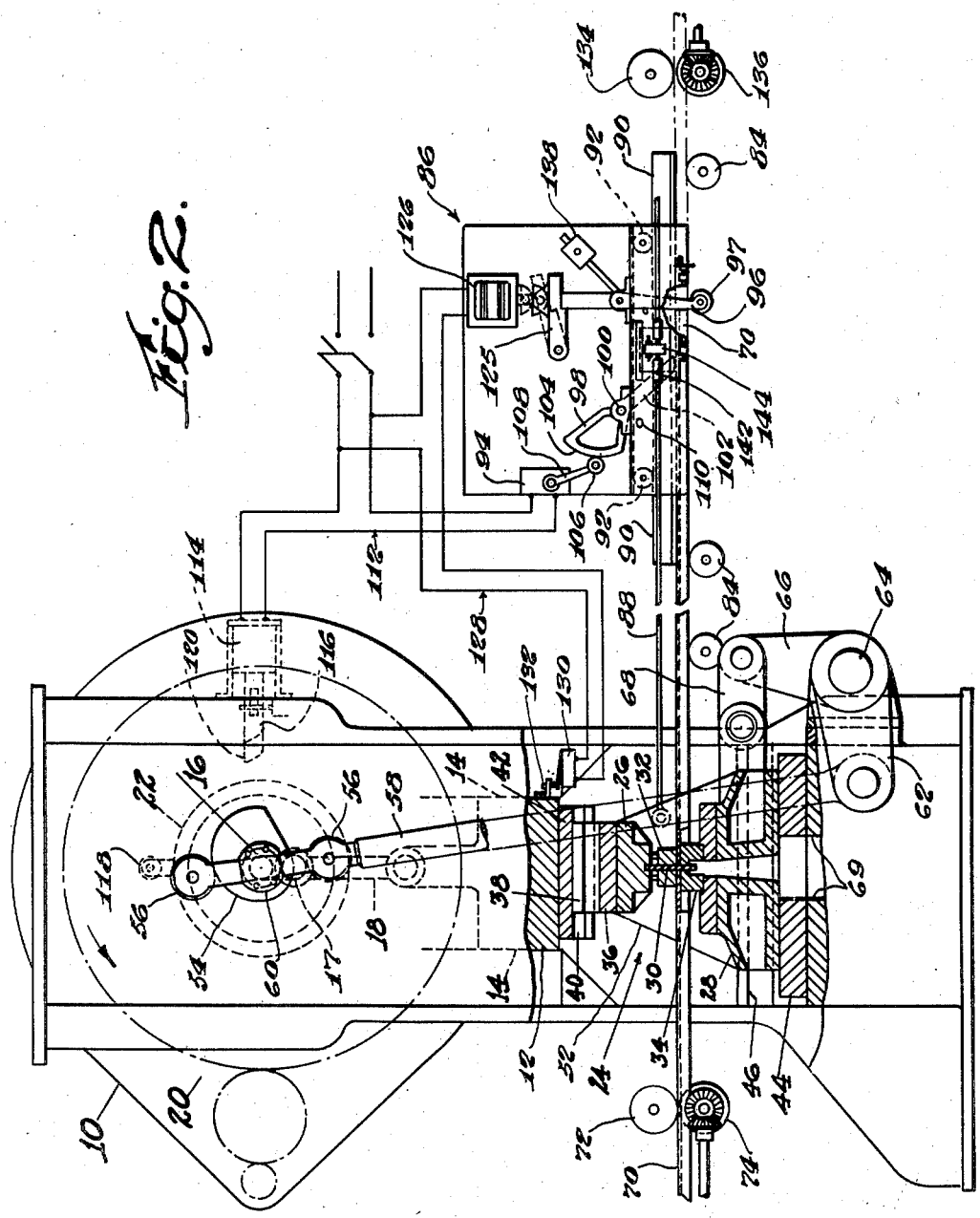

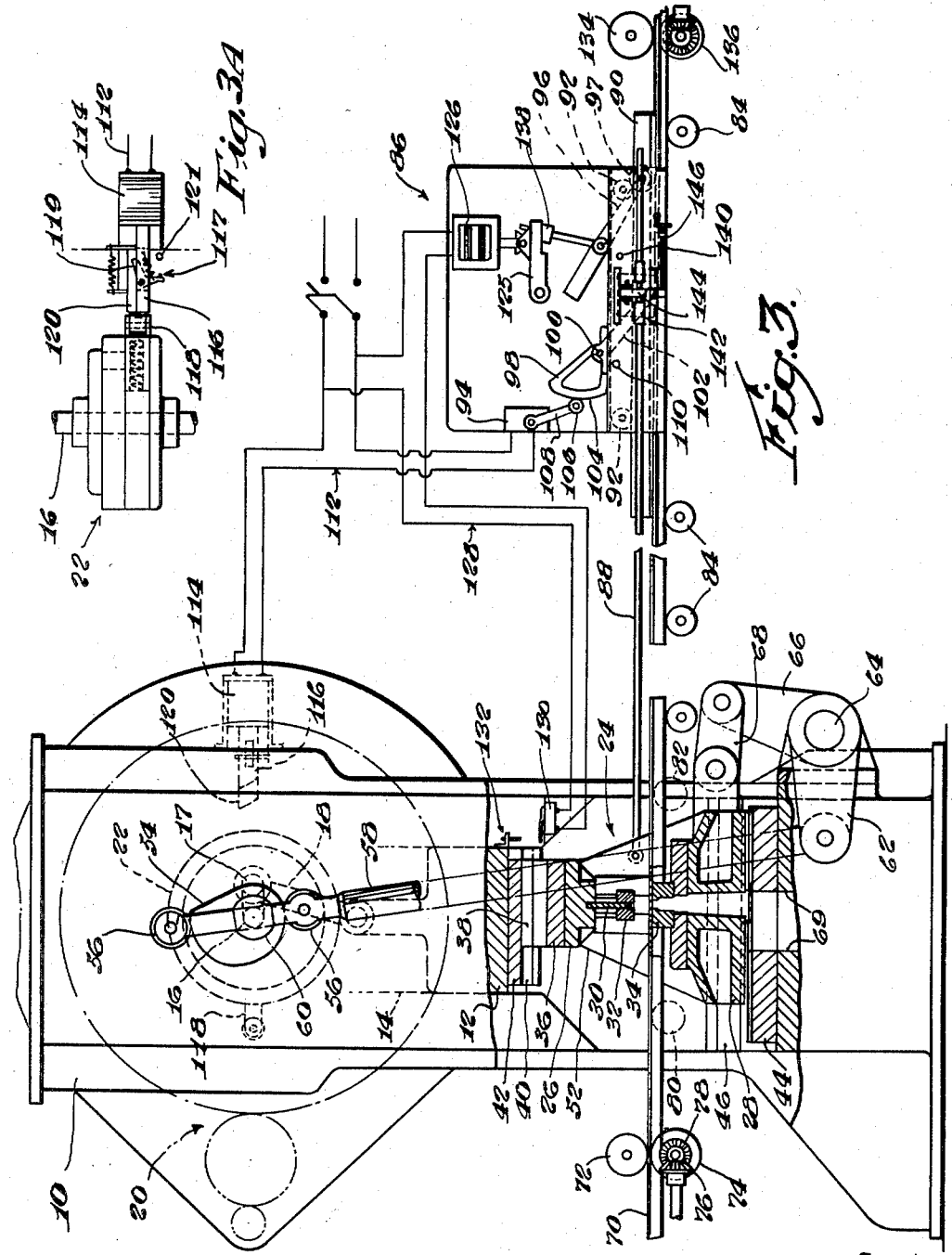

May 30, 1950 H. H. CRAFTON 2,509,760
SHEARING APPARATUS
Filed May 15, 1946 6 Sheets-Sheet 4
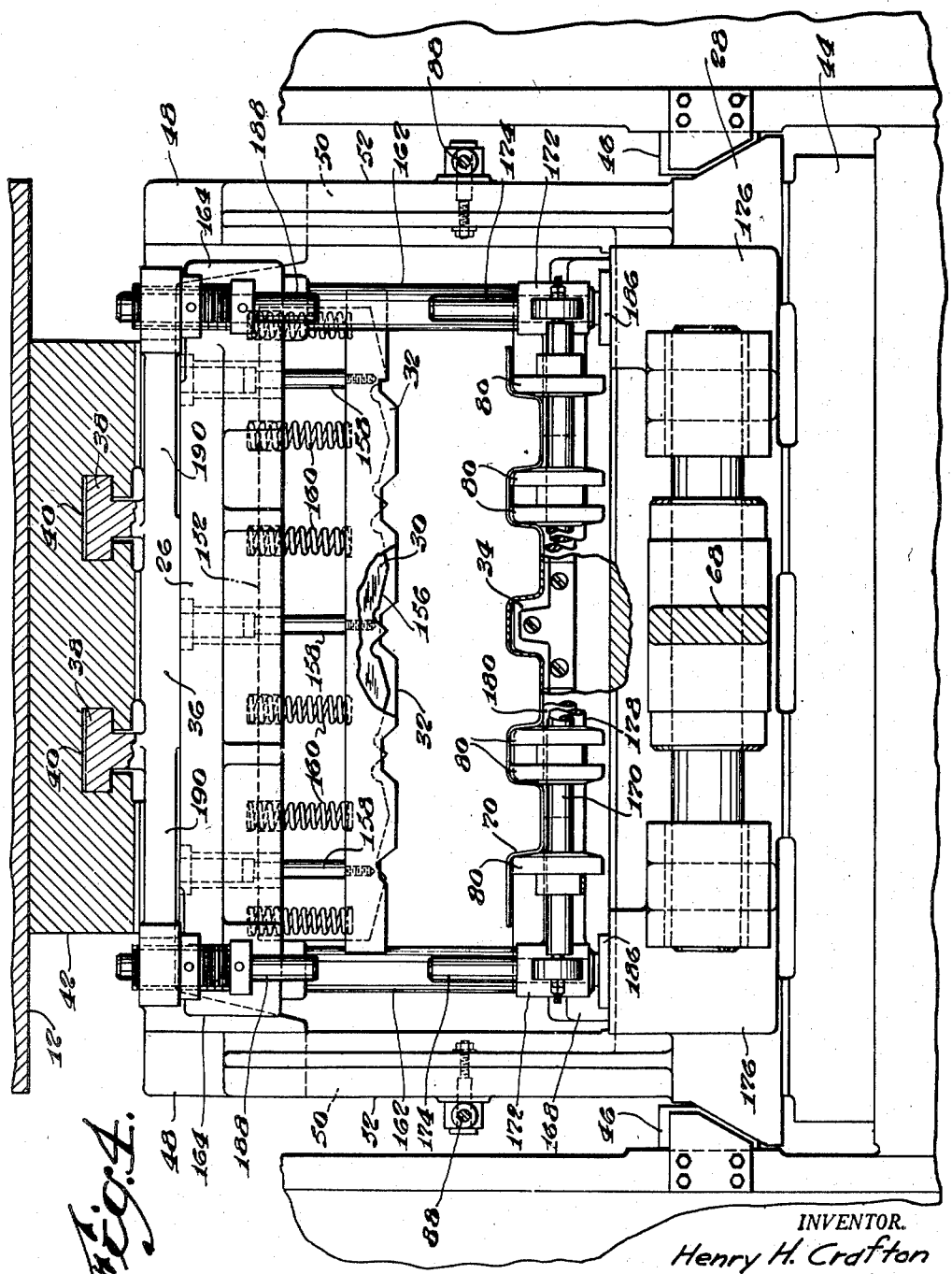
INVENTOR.
Henry H. Crafton
BY
J. Stanley Churchill
ATTORNEY

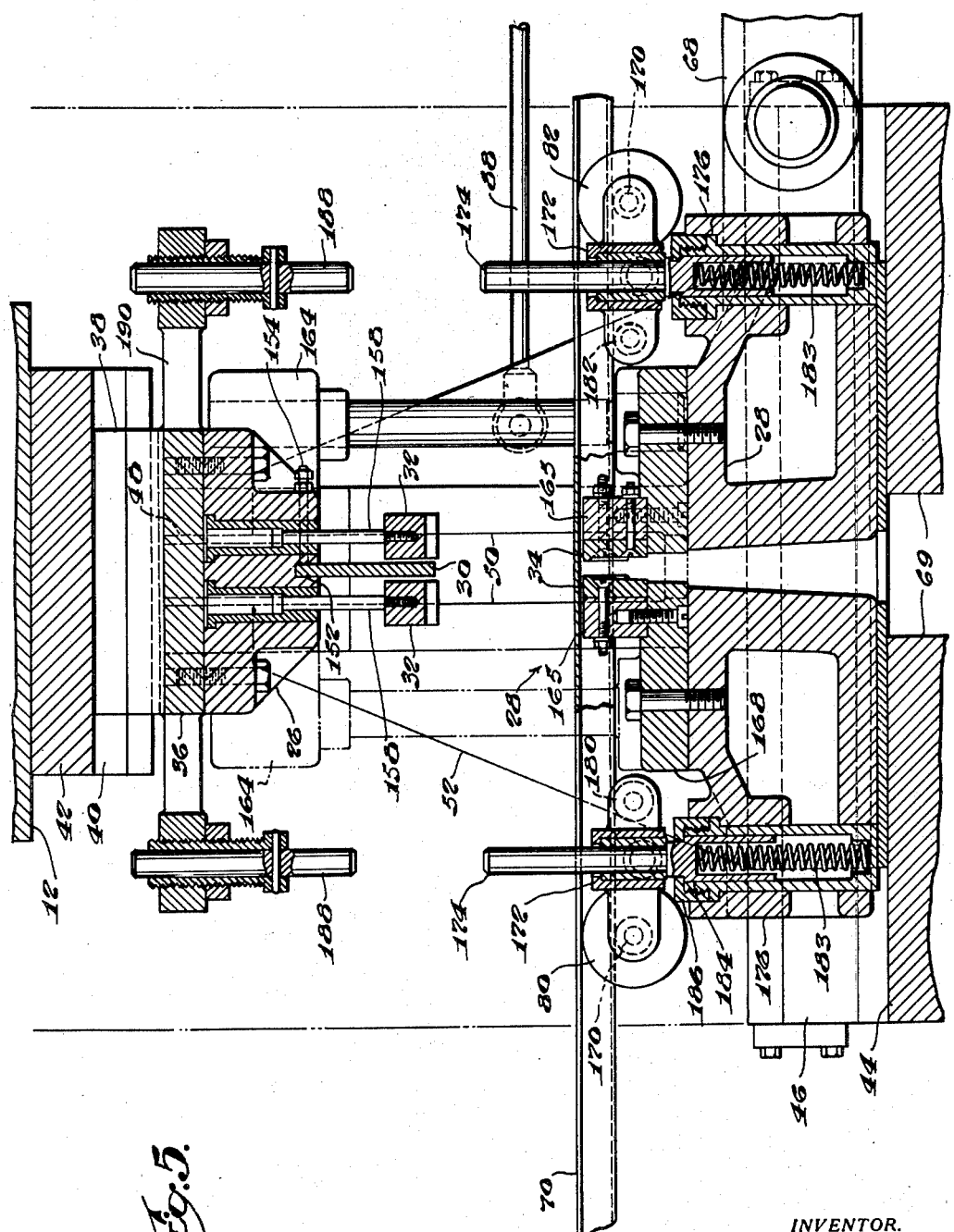

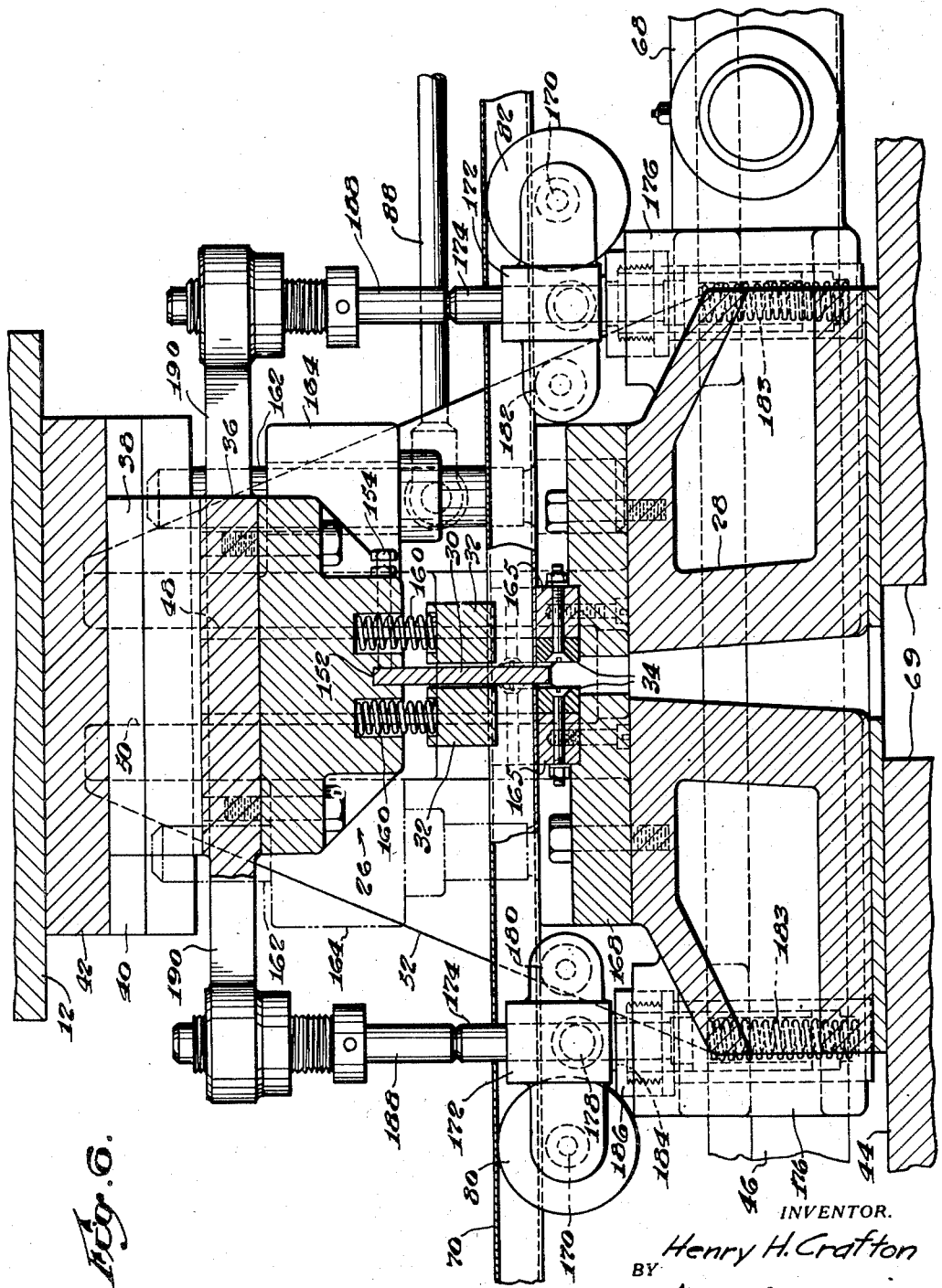

Patented May 30, 1950

2,509,760

UNITED STATES PATENT OFFICE 2,509,760

SHEARING APPARATUS

Henry H. Crafton, Baden, Pa., assignor to H. H. Robertson Company, Pittsburgh, Pa., a corporation of Pennsylvania Application May 15, 1946, Serial No. 669,755

12 Claims. (Cl. 164—49)

This invention relates to shearing apparatus.

The invention has for an object to provide novel and improved shearing apparatus having provision for cutting off uniform predetermined lengths of sheets from a continuous strip of metal during the advance of the strip through the apparatus whereby to produce successive cut to length sheets in a rapid, efficient and superior manner.

With this general object in view and such others as may hereinafter appear, the invention consists in the shearing apparatus and in the various structures, arrangements and combinations of parts hereinafter described and particularly defined in the claims at the end of this specification.

In the drawings illustrating the preferred embodiment of the invention, Figs. 1, 2 and 3 are views in side elevation, partly in cross section, of shearing apparatus and control mechanism therefor embodying the present invention and showing the apparatus in different positions of operation, to be referred to; Fig. 3A is a plan view of clutch operating mechanism to be referred to; Fig. 4 is a front elevation of the shearing mechanism; and Figs. 5 and 6 are cross sectional views in side elevation of the shearing mechanism in different positions of operation.

In general, the present invention contemplates novel shearing apparatus for producing cut to length steel sheets during the continuous advance of a strip of sheet steel through the apparatus. The present apparatus is particularly adapted for use in an installation of a line of machines for producing corrugated sheets comprising building units such as the flooring sections of the type illustrated and described in the United States Patent No. 1,867,433 issued to J. H. Young, July 19, 1932. In general, such a line of machines may include mechanism for uncoiling and leveling a strip of steel from a roll thereof and for feeding the flat strip through side trimming mechanism and between corrugating rollers in a continuous operation whereupon the corrugated and continuously moving strip is received by the present apparatus to be cut to length.

In the present apparatus, in order to effect shearing of the corrugated strip during the continuous movement thereof as it is advanced from the corrugating machine, provision is made for moving the shearing mechanism along with the strip for a short distance and for performing the shearing operation during the time when the shearing mechanism and the strip are moving at substantially the same rate of speed. Provision is also made in the preferred embodiment of the invention for automatically controlling the operation of the shearing mechanism in accordance with the advance of the strip of material to be cut whereby to produce successive uniform measured lengths of sheets cut from the continuously moving strip, as will be hereinafter more fully described.

Referring now to the drawings, the present invention is herein illustrated as embodied in a power press or shear, indicated generally at 10, having a crank operated vertically reciprocal press ram 12 arranged to be reciprocated once each cycle of operation. As herein shown, the press ram is movable in vertical guides 14 and is connected to the crank shaft 16 by a connecting link 18. The one revolution crank shaft 16 may be rotated by any usual or preferred driving mechanism including an electric motor, not shown, and through a train of gears, indicated generally at 20. The driving mechanism may and preferably will include a one revolution clutch, indicated at 22, having provision for being automatically disengaged at the end of one cycle of operation, and may also be provided with the usual braking mechanism, not shown, for bringing the mechanism to rest at the end of one revolution.

The above described portions of the power shear may comprise conventional mechanisms used in any of the commercial forms of power presses now upon the market. In accordance with the present invention, the power press or shear 10 is provided with a longitudinally reciprocal sub-press or shearing mechanism, indicated generally at 24, having an upper shearing unit or sub-press head 26 and a cooperating lower shearing unit or sub-press base 28, each unit being arranged to move in unison along with the work or material to be cut during the vertical reciprocation of the press ram 12 to perform the shearing operation. As herein shown, the upper and lower shearing units 26, 28 are provided with a die set comprising a punch blade 30 and yieldingly mounted stripper members 32 mounted in the sub-press head 26 and a pair of cooperating die blocks or cutting dies 34 carried by the sub-press base 28.

In the illustrated embodiment of the invention, the sub-press head 26, in which the punch blade 30 is mounted, is attached to an intermediate bracket 36 which is provided with T-shaped runners or guides 38 arranged to be slidably received for reciprocation in T-slots 40 formed in a top bolster 42 attached to the press ram 12. The sub-press base 28, in which the cutting dies 34 are carried, is slidably mounted on the top of a bottom bolster 44 attached to the platen of the press frame, and between angularly formed or V-shaped side guides 46 attached to the side frames of the machine. The upper and lower cooperating shearing units are connected to be moved in unison by the provision of slide blocks 48 attached to the intermediate bracket 36 of the upper shearing unit, and which are arranged to be received in vertical slots 50 formed in upstanding arms 52 extending from both sides of the base member 28, as best shown in Fig. 4.

The sub-press shearing mechanism 24, including the sub-press head 26 and sub-press base 28, is arranged to be reciprocated as a unit in timed relation to the travel of the material to be cut through connections from the crank shaft 16 provided with a cam 54 arranged to cooperate with rollers 56 carried by a connecting rod 58 slidably mounted at its upper end in a swivel bearing 60 mounted on the end of the crank shaft 16. The other end of the connecting rod 58 is connected to a lever 62 fast on a rocker shaft 64 which latter also carries an arm 66 connected to the base member 28 by a link 68. Thus, when the lower unit 28 is reciprocated through the linkage described, the upper unit 26 connected through the slide blocks 48 and slots 50 will move along in unison therewith.

As illustrated in Figs. 1, 2, and 3 the sub-press shearing mechanism 24 is arranged to be reciprocated from a position at the left of a vertical center line passing through the crank shaft 16, viewing Fig. 1, to a position at the right thereof, as shown in Fig. 3, and return, during each cycle of operation of the crank shaft, and in practice the shearing operation is performed during the forward stroke or movement from left to right, the cut being made when the unit is substantially in alignment with said vertical center line, which coincides with a slot 69, formed in the bottom bolster 44, for disposal of the scrap blank, as illustrated in Fig. 2.

The material to be cut, herein shown as comprising a continuous strip of corrugated metal 70, may be continuously fed into operative position to the shearing apparatus from a corrugating machine which may include cooperating feed rollers 72, 74 the lower one of which may be driven through bevel gears 76, 78 from the corrugating machine. The strip may be supported during its movement through the shearing apparatus on yieldingly mounted stripper rollers 80, 82 disposed on both sides of the shearing mechanism, the rollers being supported in the base member 28 as illustrated in Figs. 5 and 6. The forward end of the strip being advanced beyond the shearing mechanism may be supported upon idler rollers 84, as shown in Fig. 1.

Provision is made in the illustrated embodiment of the invention for controlling the operation of the shearing mechanism in accordance with the movement of the strip 70, and, as herein shown, this is accomplished by control mechanism incorporated in a measuring device indicated generally at 86 arranged to be actuated by the forward end of the strip 70 to effect starting of the power shear on its cycle of revolution and shearing of the strip at a predetermined time in the movement thereof after the forward end of the strip has been advanced a predetermined distance beyond the shearing mechanism whereby to automatically produce successive uniform cut to length sheets from the continuously moving strip. In order to permit continuous movement of the strip, the measuring unit 86 is also arranged to be moved along with the strip during the measuring and shearing operation and, as herein shown, the measuring unit is connected by links 88 to the upstanding arms 52 of the base member 28 so that in operation the measuring unit is reciprocated with the shearing unit. The measuring unit 86 is mounted for reciprocation longitudinally of the strip 70 on stationary rails 90 cooperating with rollers 92 carried by the measuring unit, as clearly shown in Fig. 1.

In general, the control mechanism includes a starting switch 94 arranged to be closed by engagement of the forward end of the advancing strip in order to effect starting of the power shear on its one cycle of operation, and, a solenoid held stop arm 96 disposed a short distance beyond the starting switch and against which the forward end of the strip bears during the coordinated movement of the measuring device and the strip during the shearing operation. As herein shown, the starting switch 94 is actuated by a lever 98 pivotally mounted at 100 and having a downwardly extended arm 102 disposed in the path of the advancing strip 70. The upper end of the lever 98 is provided with a cam surface 104 arranged to cooperate with a roller 106 carried by a spring pressed switch arm 108 normally held in its open position against the cam surface 104 as shown in Fig. 1. A stop pin 110 may be provided for the arm 94 to limit the clockwise movement thereof and to hold it in a vertical position until engaged by the end of the strip 70. In operation, when the forward end of the strip engages the arm 102, the latter is rocked counterclockwise to close the switch 94, as illustrated in Fig. 2, the end of the arm riding on top of the strip as it passes by.

The switch 94 forms part of a circuit 112 which includes a solenoid 114 arranged to control the one revolution clutch 22, and, as herein shown, the solenoid is provided with an armature 116 normally disposed in the path of a spring-pressed plunger 118 forming a part of the clutch 22. The armature 116 is normally arranged to hold the plunger in a depressed or clutch disengaging position, as illustrated in Fig. 1, and when the circuit 112 is closed by operation of the switch 94, the armature is pulled out of the path of the plunger to permit it to snap out into clutch engaging position. In order to discontinue the driving connection at the end of one revolution and before the armature 116 is again released into the path of the plunger by resetting of the switch 94, a second spring-pressed stop member 120 may be provided which is normally urged into the path of the plunger 118. The stop member 120 is arranged to be pulled out of the path of the plunger by a latch mechanism 117 carried by the armature 116 and engageable with a cut out portion 119 in the stop member so that upon retraction of the armature, the stop member 120 is retracted with it to permit the clutch to start on its cycle of revolution. At the end of the armature stroke the latch 117 is tripped by engagement with a pin 121 to release the stop 120 and to permit it to be urged back into clutch disengaging position. Thus, the plunger 118 is again depressed to disengage the clutch at the end of one revolution. Thereafter, when the armature 116 is reset, the latch mechanism 117 will again be engaged with the stop member 120, as illustrated.

From the description thus far it will be seen that when the end of the advancing strip 70 engages the switch 94 to close the circuit to the solenoid 114 the armature 116 is actuated to permit the clutch to be engaged in driving relationship. During this time the strip 70 is moving continuously, and, in operation, by the time the end of the strip engages the stop member 96 the clutch 22 has been fully engaged and started on its one revolution cycle to move the shearing mechanism and the control unit along with the work during the shearing operation. The engagement of the end of the strip 70 with the stop arm 96 determines the length of the sheet to be cut, that is, the distance between the shearing blade 30 and stop 96, and, this distance may be adjusted by moving the control unit 86 along its track 90 to the position desired and adjusting the connecting links 88 to conform to such predetermined position. As above described, the shearing operation is performed during the forward stroke of the shearing mechanism.

Provision is made for releasing the stop arm 96 upon shearing of the sheet to permit the sheet to pass out of the apparatus and, as herein shown, the stop arm 96 is engaged at its upper end by a pivotally mounted latch 125 connected to a solenoid 126. The solenoid 126 forms part of a circuit 128 which includes a switch 130 arranged to be closed by a contact closing member 132 attached to the press ram 12 when the latter approaches the end of its descending stroke. When the switch 130 is closed the solenoid 126 is energized to lift the latch 125 whereupon the pressure of the continuously moving sheet effects rocking of the stop arm 96 to permit the sheet to pass. As illustrated in Fig. 3, the stop arm 96 rides on top of the cut sheet as it passes thereby, the end of the arm being provided with a roller 97. The sheet is then received between driven pinch rollers 134, 136 which may and preferably will be driven at a rate slightly faster than the rate of travel of the strip through the shearing apparatus thus providing a gap between the trailing end of the cut sheet and the forward end of the continuously advancing strip, as illustrated in Fig. 3. In this manner, the trailing end of the cut sheet is permitted to pass beyond the control mechanism to allow the switch arm 102 and stop arm 96 to be reset before the forward end of the oncoming strip arrives at the control mechanism to start another cycle of operation. Upon passage of the sheet, the stop arm 96 is returned to its latched position by a counterweight 138. A stop pin 140 serves to limit the rotation of the arm 96 in a clockwise direction and to hold it in a vertical position, as shown until released by the solenoid operated latch 125. As herein shown, the adjustment of the control unit 86 with relation to the shearing mechanism 24 may be effected by a pair of collars 142 adjustably mounted on the rod 88 on either side of a longitudinally adjustable connecting element 144 carried by the control unit. Adjustment of the connecting element 144 with relation to the unit 86 may be effected by a threaded rod 146 having a handle 148 and which is connected to the lower end of the element 144, as illustrated. The connection may also include a yieldable element 150, as shown, arranged to reduce the shock incident to starting and stopping of the unit.

As above stated, the movement of the shearing mechanism 24 is coordinated with the movement of the power press 10 by the cam operated linkage described, and, correct timing of the shearing operation is obtained by setting the cam 54 in predetermined relation to the crank shaft 16.

As illustrated in Fig. 1, at the start of a cycle of operation, the crank arm 17 is extended horizontally to the left at which time the cam 54 is in position to hold the movable shearing unit 24 to the left of the scrap discharge opening 69 in the bolster 44. Upon driving engagement of the clutch 22 the crank arm 17 is started in rotation in a counterclockwise direction, the cut being made when the crank arm 17 arrives in a vertical position, at which time the shearing mechanism is disposed in the center of the apparatus with the shearing elements in alignment with the scrap disposal slot 69, as illustrated in Fig. 2. The shearing blade 30 is then elevated during the further advancement of the shearing mechanism to the extreme right hand position at which time the crank arm 17 is extended horizontally to the right, as shown in Fig. 3. The shearing unit 24 is then retracted to its starting position during the travel of the crank arm 17 through the 180 degrees over the top arc of the cycle in a counterclockwise direction from a horizontally extended position to the right to a horizontally extended position to the left, and, during this time, the upper shearing unit 26 is elevated to its extreme upward position and back to its intermediate or starting position, shown in Fig. 1. At this time, the crank shaft is brought to rest by disengagement of the clutch by the stop member 120 and operation of the brake in the usual manner, and, upon movement of the cut sheet beyond the control mechanism, the controls are reset to await another cycle of operation as initiated by the engagement of the front edge of the remaining strip with the arm 102, as described.

Referring now to Figs. 4, 5 and 6 for a more detailed description of the shearing mechanism 24, as therein shown the shear blade 30 is supported in a slot 152 formed in the head bracket 26 and is detachably secured thereto by set screws 154. The shearing edge 156 of the blade may and preferably will be shaped to accommodate and to conform generally to the cross sectional shape of the corrugated strip to be cut, as illustrated in Fig. 4. The stripped blocks 32 cooperating with the cutter blade are supported by pins 153 slidingly mounted for vertical reciprocation in the head 26 and are yieldingly urged downwardly by springs 160 interposed between the head and the blocks, as illustrated. The stripper blocks serve the usual purpose of holding the material to be cut firmly against the dies 34 during the shearing operation and prevent the material from being carried upwardly by the cutter blade upon elevation thereof at the end of the shearing operation. The vertical rods 162 upstanding from the base 28 comprise registering pins which are slidingly received in bearing members 164 carried by the head member 26. The cutting dies 34, as herein shown, are detachably secured to supporting blocks 165 which are attached to an intermediate plate 168 mounted on the base member 28.

During the progress of the strip 70 through the shearing apparatus it is supported by the yieldingly mounted stripping rollers 80, 82 disposed on either side of the shearing mechanism and which are arranged to engage the undersurface of the upper portions of the corrugated strip to hold the same in a slightly elevated position above the dies 34 to clear the latter during the time the strip is being advanced to cutting position, and, which are arranged to be depressed to allow the strip to be held tightly against the dies during the shearing operation. As herein shown, each set of rollers 80, 82 is rotatably mounted on a shaft 170 extended between brackets 172 carried by studs 174 mounted for vertical movement in bearing members 176 carried by the base member 28. Each pair of brackets 172 is connected by a tie rod 178 and, as herein shown, each pair of brackets is provided with a second set of rollers, 180, 182 arranged to engage the undersurface of the lower portions of the corrugated strip. Each roller supporting stud 174 is yieldingly mounted in its bearing member 176 by a spring 183 arranged to urge the rollers upwardly, and, each stud is adjustably limited in its upward movement by a shouldered portion 184 arranged to bear against a threaded cap member 186 provided at the upper end of the bearing. The stripping rollers are arranged to be depressed by cooperating studs 188 disposed in alignment with the studs 174 and which are adjustably carried by extensions 190 from the intermediate bracket 36 of the upper shearing unit 26, as clearly shown in Fig. 5. Thus, in operation, when the upper shearing unit 26 is lowered to perform the shearing operation, the rollers are yieldingly depressed for the purpose described, and, upon elevation of the same the rollers are again brought into supporting relationship with the strip to hold it clear of the dies 34 during the continued advancement thereof, as described.

From the above description of the preferred embodiment of the invention and the mode of operation thereof it will be seen that the present shearing apparatus is provided with shearing mechanism movable with the material to be cut during the shearing operation, and, with control mechanism actuated by the forward edge of the material also movable with the material in unison with the shearing mechanism, for automatically starting a cycle of operation of the shearing mechanism whereby successive predetermined cut to length sheets may be produced in a novel, rapid and efficient manner.

While the preferred embodiment of the invention has been herein illustrated and described, it will be understood that the invention may be embodied in other forms within the scope of the following claims.

Having thus described the invention, what is claimed is:

1. Apparatus of the character described having in combination, means for supporting and continuously feeding an elongated strip of metal, shearing mechanism for effecting a transverse shear of the strip, operating means for said shearing mechanism including a crank shaft means operatively connected to said crank shaft for moving said shearing mechanism longitudinally of and along with the continuously moving strip during the shearing operation, and control means actuated by the forward edge of said strip for controlling the operation of said shearing mechanism, said control means being operatively connected to said shearing mechanism to move along therewith and with the strip being cut, during the shearing operation whereby to produce successive cut-to-length sheets from said continuously moving strip.

2. Apparatus of the character described having in combination, means for supporting and continuously advancing an elongated strip of metal, vertically reciprocal shearing mechanism for effecting a transverse shear of the strip, means for moving said shearing mechanism longitudinally of and along with the continuously advancing strip during the shearing operation, operating means for said shearing mechanism including a crank shaft and connections arranged to effect simultaneous vertical and longitudinal reciprocation of said shearing mechanism, and control means spaced a predetermined distance from said shearing mechanism and movable therewith arranged to be actuated by the forward edge of said strip for effecting driving engagement of said operating means to initiate the shearing operation whereby to produce successive uniform cut-to-length sheets from said continuously moving strip.

3. Apparatus of the character described having in combination, means for supporting and continuously advancing an elongated strip of metal, vertically reciprocal shearing mechanism for effecting a transverse shear of the strip, means for moving said shearing mechanism longitudinally of and along with the continuously advancing strip during the shearing operation, operating means for said shearing mechanism, control means spaced a predetermined distance from said shearing mechanism and movable therewith arranged to be actuated by the forward edge of said strip for effecting driving engagement of said operating means to initiate the shearing operation, and means for engaging and rapidly advancing a cut sheet to provide a gap between the trailing end of the cut sheet and the newly formed forward edge of the strip to permit resetting of said control means for a subsequent shearing operation whereby to produce successive uniform cut-to-length sheets from said continuously moving strip.

4. Shearing apparatus having in combination, means for supporting and continuously feeding a strip of metal through the apparatus, shearing mechanism including a vertically reciprocal shear blade and a pair of cooperating cutting dies for effecting a transverse shear of the strip, said shearing mechanism being also mounted for horizontal reciprocation longitudinally of the strip, operating means for said shearing mechanism including a crank shaft for effecting vertical reciprocation of said shear blade, and connections including a cam mounted on said crank shaft for effecting movement of the shearing mechanism along with the strip during the shearing stroke and retraction thereof during the elevating stroke of said shear blade.

5. Apparatus of the character described having in combination, means for supporting and continuously advancing an elongated strip of metal, vertically reciprocal shearing mechanism for effecting a transverse shear of the strip, means for also moving said shearing mechanism longitudinally of and along with the continuously advancing strip during the shearing operation, operating means for said shearing mechanism including a one revolution clutch, and control means spaced a predetermined distance from said shearing mechanism and movable therewith arranged to be actuated by the forward edge of said continuously moving strip, said control means including a pivoted arm disposed in the path of said forward edge and arranged to be moved thereby to effect driving engagement of said one revolution clutch to initiate the shearing operation, a second arm comprising a latch held stop arm spaced from said first arm and against which the forward edge of the strip bears during the shearing operation, means for releasing said latch held arm at the end of the shearing stroke to permit the cut sheet to pass beyond the control mechanism, and means for rapidly advancing said cut sheet to provide a gap between the latter and the newly formed forward edge of the strip to permit the control arms to be reset for a subsequent shearing operation.

6. Apparatus of the character described having in combination, means for supporting and continuously advancing an elongated strip of metal, vertically reciprocal shearing mechanism for effecting a transverse shear of the strip, means for also moving said shearing mechanism longitudinally of and along with the continuously advancing strip during the shearing operation, operating means for said shearing mechanism including a one revolution clutch, and control means spaced a predetermined distance from said shearing mechanism and movable therewith arranged to be actuated by the forward edge of said continuously moving strip, said control means including a pivoted arm disposed in the path of said strip, an electrical circuit having a switch arranged to be closed by movement of said arm, and a solenoid operated member arranged to permit said one revolution clutch to be engaged in driving relationship to initiate the shearing operation upon closing of said switch, a second arm comprising a stop arm spaced from said first arm and against which the forward edge of said strip bears during the shearing operation, a second electrical circuit including a solenoid operated latch for holding said second arm in the path of the strip during the shearing operation, and a switch arranged to be closed at the end of the shearing stroke to actuate said solenoid operated latch to release said stop arm and to permit the cut sheet to pass beyond the control means, and means for rapidly advancing said cut sheet to provide a gap between the latter and the newly formed forward edge of the strip to permit the control arms to be reset for a subsequent shearing operation.

7. Apparatus of the character described having in combination, means for supporting and continuously feeding a strip of metal through the apparatus, shearing mechanism including a vertically reciprocal shear blade and a pair of cooperating cutting dies for effecting a transverse shear of the strip, means for moving said shearing mechanism longitudinally of and along with the continuously moving strip during the shearing operation, and stripping means associated with said shearing mechanism comprising a pair of yieldingly mounted blocks disposed on either side of said shear blade and arranged to engage and hold the strip down during the shearing operation and during a portion of the elevating stroke of said shear blade.

8. Apparatus of the character described having in combination, means for supporting and continuously feeding a strip of metal through the apparatus, shearing mechanism including a vertically reciprocal shear blade and a pair of cooperating cutting dies for effecting a transverse shear of the strip, means for moving said shearing mechanism longitudinally of and along with the continuously moving strip during the shearing operation, and stripping means associated with said shearing mechanism comprising a pair of yieldingly mounted blocks disposed on either side of said shear blade and arranged to engage and hold the strip down during the shearing operation and during a portion of the elevating stroke of said shear blade, said strip supporting means including yieldingly mounted rollers arranged to hold the strip clear of said dies during the advancement of the strip when the shearing mechanism is idle, and means carried by the upper portion of the shearing mechanism arranged to retract said yieldingly mounted rollers to permit the strip to bear against the dies during the shearing operation.

9. Apparatus of the character described having in combination, means for supporting and continuously advancing an elongated strip of metal, vertically reciprocal shearing mechanism for effecting a transverse shear of the strip, said shearing mechanism being also mounted for horizontal reciprocation longitudinally of the strip, operating means including a crank shaft for effecting simultaneous vertical and horizontal reciprocation of the shearing mechanism, and control means including a carriage operatively connected to and movable longitudinally with the shearing mechanism, means carried by the carriage and arranged to be actuated by the forward edge of the continuously moving strip for initiating operation of the shearing mechanism; a stop member also carried by said carriage and against which the forward edge of the strip bears during the shearing operation, and means for releasing said stop at the end of the shearing stroke to permit the cut sheet to pass beyond the control means.

10. Apparatus of the character described having in combination, means for supporting and continuously feeding an elongated strip of metal, shearing mechanism for effecting a transverse shear of the strip, said shearing mechanism being also mounted for horizontal reciprocation longitudinally of the strip, control means actuated by the forward edge of the strip for initiating operation of the shearing mechanism, a stop member operatively connected to and movable longitudinally with the shearing mechanism and against which the forward edge of the strip bears during the shearing operation, and means for releasing said stop at the end of the shearing stroke to permit the cut sheet to pass beyond the control means.

11. Apparatus of the character described having in combination, means for supporting and continuously feeding an elongated strip of metal, vertically reciprocal shearing mechanism for effecting a transverse shear of the strip, said shearing mechanism being also mounted for horizontal reciprocation longitudinally of the strip, operating means for effecting simultaneous vertical and horizontal reciprocation of said shearing mechanism, control means actuated by the forward edge of the moving strip for initiating operation of the shearing mechanism, a stop member operatively connected to and movable longitudinally with the shearing mechanism, the forward edge of the continuously moving strip being caused to come into engagement with the moving stop immediately prior to the shearing operation, and means for releasing the stop upon completion of the shearing stroke to permit the cut sheet to pass beyond the control means.

12. Apparatus of the character described having in combination, means for supporting and continuously advancing an elongated strip of metal, vertically reciprocal shearing mechanism for effecting a transverse shear of the strip, means for also moving said shearing mechanism longitudinally of and along with the continuously advancing strip during the shearing operation, operating means for said shearing mechanism including a one revolution clutch, and control means spaced a predetermined distance from said shearing mechanism and movable therewith arranged to be actuated by the forward edge of said continuously moving strip, said control means including a pivoted arm disposed in the path of said forward edge and arranged to be moved thereby to effect driving engagement of said one revolution clutch to initiate the shearing operation, a second arm comprising a latch held stop arm spaced from said first arm and against which the forward edge of the strip bears during the shearing operation, and means for releasing said latch held arm at the end of the shearing stroke to permit the cut sheet to pass beyond the control means.

HENRY H. CRAFTON.

REFERENCES CITED

The following references are of record in the file of this patent:

UNITED STATES PATENTS

| Number | Name | Date |
|---|---|---|
| 1,130,979 | Johnson | Mar. 9, 1915 |
| 2,133,542 | Jensen | Oct. 18, 1938 |